Figure 1:
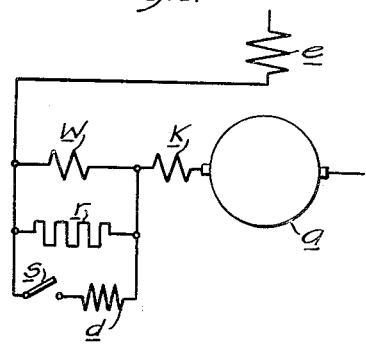

Nov. 7, 1939.                R. STIX                 2,179,358
              ALTERNATING-CURRENT COMMUTATOR MOTOR
                      Filed Aug. 14, 1937

WITNESSES:
E. A. McCloskey
Nrs. C. Groome

INVENTOR
Robert Stix.
BY
O. B. Buchanan
ATTORNEY

Patented Nov. 7, 1939

2,179,358

UNITED STATES PATENT OFFICE 2,179,358

ALTERNATING-CURRENT COMMUTATOR MOTOR

Robert Stix, Vienna, Austria, assignor to Westinghouse Electric & Manufacturing Company, East Pittsburgh, Pa., a corporation of Pennsylvania Application August 14, 1937, Serial No. 159,040
In Austria August 19, 1936

14 Claims. (Cl. 172—276)

The invention relates to alternating-current commutator motors, particularly railway motors with commutating poles, and its object is to render such motors suitable for interchangeable drive with two or more supply-line frequencies. To make this possible, it is necessary to provide satisfactory commutation of the motor for all frequencies coming into consideration.

The invention attains this object by connecting impedances or impedance-combinations with variable reactance (inductance or capacity) in parallel to the commutating-pole windings, or to the compensating windings, or to portions of these windings; so that, by varying these impedances, the rotating field may be adapted, in magnitude and phase, to the operation at the different frequencies.

For operation with constant frequency the necessary phase-displacement between the commutating field and the armature current is obtained, as is known, by the parallel connection of a corresponding ohmic resistor to the commutating-pole windings.

For interchangeable operation of commutator motors on either alternating or direct current, a choke has heretofore been connected in parallel to the commutating-pole windings in addition to the ohmic resistor, and by reason of its small ohmic resistance the choke draws away a large portion of the armature current from the commutating-pole windings during direct-current operation. For the purposes of my invention, that is, for operation on either of two different frequencies, both alternating-current, this arrangement is not suitable, since such a choke has had an invariable inductance, and it has been connected all the time to the windings.

In general, in changing to the lower frequency, the object of my invention is attained either by increasing the inductive effect of the impedance-combination connected in parallel to the commutating-pole winding, which may be done by connecting an inductive impedance device into the circuit or by changing the inductance of such an impedance device, or by decreasing the capacitive effect of the whole impedance-combination, which may be done by disconnecting a capacitive impedance device or by changing such an impedance device.

The change in the impedance-combination (by connecting or disconnecting the inductive or capacitive impedances or by changing their impedance values), in the transition from one frequency to the other, may take place either manually, by an operation of the service man, or automatically.

By a suitable arrangement of the impedance, it is even possible to automatically obtain a frequency-responsive change in the inductance or the capacitance of the impedance-combinations, in the direction required by the invention, without special switching means.

In the drawing, different exemplary embodiments are shown.

Figure 2:
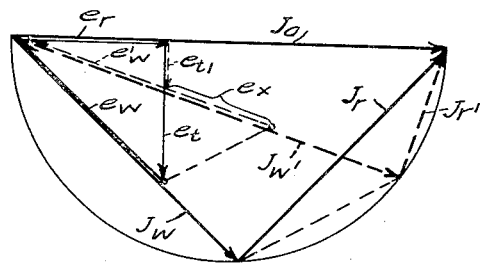
Figure 3:
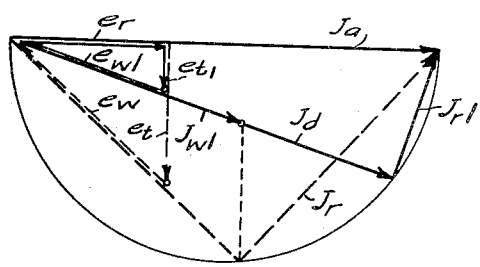
Figure 4:
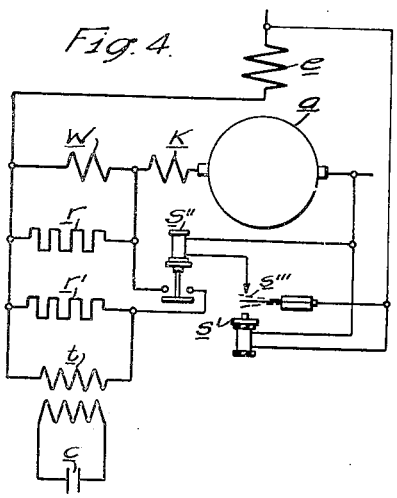
Figure 5:
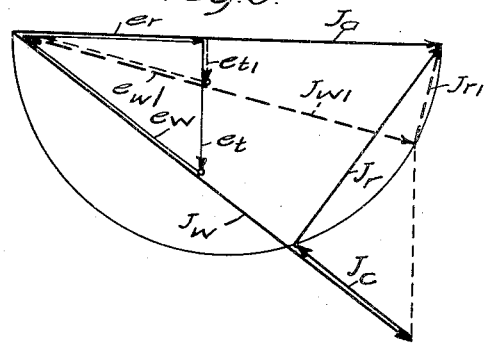
Figure 6:
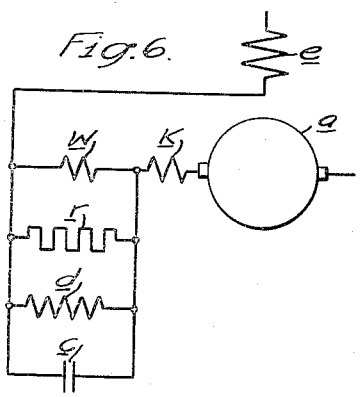

Figure 1 is a diagrammatic view of circuits and apparatus embodying the invention in a simple form, Figs. 2 and 3 are vector diagrams illustrative of the operation of the apparatus shown in Fig. 1, Fig. 4 is a view similar to Fig. 1, showing a modification, Fig. 5 is a vector diagram illustrative of the operation of the apparatus shown in Fig. 4, and Fig. 6 is a view similar to Figs. 1 and 4, showing a still further modification.

In Fig. 1, $a$ identifies the armature of a single-phase commutator motor which, for example, is to be operated interchangeably at either 50 cycles or 16⅔ cycles, $e$ is the exciting winding of the motor, $w$ is the commutating-pole winding or interpole winding, and $k$ is the compensating winding. It will be understood that the commutating-pole winding $w$ and the compensating winding $k$ are disposed on a "commutating" axis approximately 90 electrical degrees from the "exciting" axis of the exciting winding $e$, as shown in Fig. 1. An ohmic resistor $r$ is connected in parallel to the commutating-pole winding $w$, and, in addition, there is similarly connected a choke coil $d$ which may be switched in and out by a switch $s$.

Fig. 2 shows the operation of this arrangement diagrammatically. For a supply-line frequency of 50 cycles, the switch $s$ is open. The armature current $J_a$ is composed of a current $J_r$ flowing through the resistor $r$ and a current $J_w$ flowing through the commutating-pole winding, the latter current being displaced with reference to the armature current to such an extent that the potential $e_w$ which is produced by its field in the short-circuited armature coils neutralizes the reactance potential $e_r$ and the transformer arcing potential $e_t$. At 16⅔ cycles, it is not possible to obtain an arcless commutation with the parallel resistor $r$ alone. The operating relationships are indicated in this case in dotted lines in the diagram of Fig. 2. The transformer arcing potential is only $e_{t1}(=1/3 e_t)$ as contrasted with what it was before, and the inductive impedance of the commutating-pole winding is also only one-third of the inductive impedance for 50 cycles. The resultant current-distribution would therefore be $J_w'$ and $J_r'$. The commutating potential produced in the short-circuited coils would then be $e'_w$. This potential indeed has a proper phase position but not the proper magnitude, as there remains an unequalized residual potential $e_x$ which prevents satisfactory commutation.

By the addition of the choke coil $d$ at the lower frequency, as provided by the invention, the proper rotating field of potential may also be obtained at this frequency. By proper dimensioning of the choke coil $d$ the current distribution reproduced in Fig. 3 results. $J_{w1}$ is the current in the commutating-pole winding, $J_d$ is the current in the choke coil, and $J_{r1}$ is the current in the resistance $r$. ($J_{w1}$ and $J_d$ are in phase since both are inductive currents.) For purposes of comparison the current-distribution at the higher frequency is also shown in dotted lines. The commutating-field potential produced by the field of the current $J_{w1}$ is $e_{w1}$; it now has a proper phase and magnitude.

The same effect may also be obtained if, instead of connecting and disconnecting the choke coil $d$, it is left continuously connected in circuit, but varied, so that its inductance is decreased, at the lower frequency, by disconnecting a portion of its windings, thus increasing its inductive shunting-effect in absorbing a larger inductive current, and I desire my illustration in Fig. 1 to be a diagrammatic representation inclusive of this possibility.

The connection and disconnection of the choke coil, or the connecting in and out of the individual portions of the choke coil, may take place by hand or automatically, as by an adaptation of a tuned-reed frequency-responsive relay $s'$ cooperating with a sluggishly acting relay $s''$, as shown in Fig. 4.

In lieu of an inductive impedance a capacitive impedance may also serve for adapting the commutating-field potential to the different frequencies. In this case, however, conversely to that in the case of the application of chokes, the condenser is to be disconnected at the lower frequency, or the capacitive shunting-effect at this frequency is to be decreased by decreasing the capacity.

Fig. 4 shows a circuit of a corresponding exemplary embodiment of the invention. In Fig. 4, as in Fig. 1, $a$ identifies the armature of the alternating-current commutator motor, $e$ is its exciting winding, $w$ is the commutating-pole, $k$ is the compensating winding, and $r$ is the resistor connected in parallel to the commutating-pole winding. The embodiment shown in Fig. 4 utilizes a capacitor $c$ connected in parallel to the resistor $r$ and to the commutating-pole winding $w$, preferably through a transformer $t$, to make possible a smaller dimensioning of the capacitor. The capacitor $c$ may be connected in and out by means of a sluggishly acting electromagnetic switch or relay $s''$ which may be controlled by means of a frequency-responsive relay $s'$ having a reed $s'''$ tuned to the higher frequency so that the relay $s''$ is energized, connecting the primary of the transformer $t$ into circuit, when a frequency of 50 cycles is applied to the motor.

As shown in Fig. 5, when the motor of Fig. 4 is impressed with the higher frequency, the current $J_w$ flows through the commutating-pole winding $w$, the current $J_c$ (opposite in phase to the current $J_w$) flows through the capacitor $c$, and the current $J_r$ flows through the resistor $r$; $e_r$ is the reactance potential, $e_t$ the transformer arc-ing potential at the higher frequency, and $e_w$ the commutating-field potential produced by the field of the current $J_w$. The last-mentioned potential $e_w$ neutralizes the resultant of $e_r$ and $e_t$.

At the lower frequency, the capacitor $c$ is disconnected by the opening of the relay $s''$. As shown in Fig. 5, the current $J_{w1}$ then flows through the commutating-pole winding, and the current $J_{r1}$ flows through the ohmic resistor. $J_{w1}$ has decreased in the same ratio as the resultant $e_{w1}$ of the potentials $e_r$ and $e_{t1}$, so that favorable commutating relationships exist at both the higher and the lower frequencies.

Under certain circumstances it may be desirable to add a resistance component in addition to the introduction of a capacity at the higher frequency. For this purpose, a suitable ohmic resistor $r'$ may be connected parallel to the capacitor, to be connected in and out simultaneously with the capacitor, as shown in Fig. 4. The same is also possible in the combination utilizing a choke coil in Fig. 1.

It is possible to utilize inductors and capacitors at the same time, and to variably connect the same in or out of circuit, thus adding a capacitive impedance-component at the higher frequency, and adding an inductive impedance-component at the lower frequency. This may be of advantage if the commutating-pole winding is too small to produce satisfactory current-commutation, at the frequency in question, with a pure ohmic resistor connected in parallel to the commutating-pole winding.

By the combined use of inductance and capacity, it is additionally possible, in certain arrangements, to obtain a completely automatic adjustment of the proper current-commutation requirements for each of the supply-line frequencies, without the necessity of connecting resistors in or out of circuit.

Fig. 6 shows a combination consisting of a choke coil $d$ and a capacitor $c$, properly dimensioned to correspond to the frequencies of the supply-lines under consideration, connected in parallel to the commutating-pole winding $w$ and the resistor $r$. This arrangement operates automatically in such manner that, at each of the frequencies in question, the desired commutating-field potential results without alteration in the connections. If, at the higher frequency, the inductance $d$ of the impedance-combination is compensated, and thus rendered inactive, by the capacitor $c$, the arrangement operates as if only the ohmic resistance $r$ were connected in parallel to the commutating-pole winding, as, for example, in the arrangement of Fig. 1 with the choke coil disconnected. At the lower frequency, however, only a portion of the inductance is compensated by the capacitor; a corresponding inductive component is therefore manifested and it has the same effect as the choke coil when connected in circuit in Fig. 1.

This arrangement may also be constructed in such manner that, at the higher frequency, the capacity of the condenser overcomes the inductance of the choke coil, while at the lower frequency it is compensated by the inductance of the choke coil; or it may happen that the capacity predominates at the higher frequency and that the inductance predominates at the lower frequency. In all cases, it is possible, without connecting or disconnecting of resistors, automatically to attain the proper commutation-relationships.

On economic grounds, it may be desirable to connect the capacity of Fig. 6, as in Fig. 4, through a transformer $t$. The latter may advantageously also at the same time take over the function of the choke coil $d$, in which case the transformer $t$ will be designed with a large leakage.

I claim as my invention:

1. An alternating-current commutator motor having exciting-axis windings and commutation-axis windings, and a shunting means connected in parallel to at least a portion of said commutation-axis windings, said shunting means including a capacitive impedance means.

2. An alternating-current commutator motor having exciting windings, commutating-pole windings and compensating windings, and a shunting means connected at least to a portion of said commutating-pole windings, said shunting means including a capacitive impedance means.

3. An alternating-current commutator motor having exciting-axis windings and commutation-axis windings, an impedance device composed largely of resistance, a capacitive reactance device, means for connecting said impedance device in parallel to at least a portion of said commutation-axis windings, and means for connecting said capacitive reactance device in parallel circuit relation to at least a portion of said commutation-axis windings and in parallel circuit relation to said impedance device.

4. An alternating-current commutator motor having exciting windings, commutating-pole windings and compensating windings, an impedance device composed largely of resistance, a capacitive reactance device, means for connecting said impedance device in parallel to at least a portion of said commutating-pole windings, and means for connecting said capacitive reactance device in parallel circuit relation to at least a portion of said commutating-pole windings and in parallel circuit relation to said impedance derive.

5. An alternating-current commutator motor having exciting-axis windings and commutation-axis windings and a shunting means connected in parallel to at least a portion of said commutation-axis windings, said shunting means including an impedance device composed largely of resistance, an inductive impedance device, and a capacitive impedance device all connected in parallel circuit relation to each other.

6. On alternating-current commutator motor having exciting windings, commutating-pole windings and compensating windings, and a shunting means connected at least to a portion of said commutating-pole windings, said shunting means including an impedance device composed largely of resistance, an inductive impedance device, and a capacitive impedance device all connected in parallel circuit relation to each other.

7. An alternating-current commutator motor having exciting-axis windings and commutation-axis windings, and a shunting means connected in parallel to at least a portion of said commutation-axis windings, said shunting means including an impedance device composed largely of resistance, and inductive impedance device, and a capacitive impedance device all connected in parallel circuit relation to each other, the inductance and capacitance being approximately in resonance at a rated operating frequency of the motor.

8. An alternating-current commutator motor having exciting windings, commutating-pole windings and compensating windings, and a shunting means connected at least to a portion of said commutating-pole windings, said shunting means including an impedance device composed largely of resistance, an inductive impedance device, and a capacitive impedance device all connected in parallel circuit relation to each other, the inductance and capacitance being approximately in resonance at a rated operating frequency of the motor.

9. An alternating-current commutator motor having exciting-axis windings and commutation-axis windings, and a shunting means connected in parallel to at least a portion of said commutation-axis windings, said shunting means including an impedance device composed largely of resistance and a high-leakage transformer in parallel circuit relation to each other, and a capacitor connected in the secondary circuit of the transformer.

10. An alternating-current commutator motor having exciting windings, commutating-pole windings and compensating windings, and a shunting means connected at least to a portion of said commutating-pole windings, said shunting means including an impedance device composed largely of resistance and a high-leakage transformer in parallel circuit relation to each other, and a capacitor connected in the secondary circuit of the transformer.

11. An alternating-current commutator motor having exciting-axis windings and commutation-axis windings, and a shunting means connected in parallel to at least a portion of said commutation-axis windings, said shunting means including an impedance device composed largely of resistance and a high-leakage transformer in parallel circuit relation to each other, and a capacitor connected in the secondary circuit of the transformer, the inductance of the transformer and the capacitance of the capacitor being approximately in resonance at a rated operating frequency of the motor.

12. An alternating-current commutator motor having exciting windings, commutating-pole windings and compensating windings, and a shunting means connected at least to a portion of said commutating-pole windings, said shunting means including an impedance device composed largely of resistance and a high-leakage transformer in parallel circuit relation to each other, and a capacitor connected in the secondary circuit of the transformer, the inductance of the transformer and the capacitance of the capacitor being approximately in resonance at a rated operating frequency of the motor.

13. An alternating-current commutator motor adapted to operate at either one of at least two materially different alternating-current frequencies, said motor having exciting-axis windings and commutation-axis windings, a shunting means connected in parallel to at least a portion of said commutation-axis windings, said shunting means having an effective impedance composed of a materially large resistance component R and a reactance component $jX$, where R is real and positive, and X is either real and positive, representing an inductance, or zero, or real and negative, representing a capacitance, impedance-changing means for, at times, causing an increase in X, regarding X as being increased when changing from more negative to less negative, or from less positive to more positive, or from negative to positive, and frequency-responsive means, responsive to one of the operating frequencies of the motor, for effecting an appropriate change in the condition of said impedance-changing means in such manner as to cause X to have an increased value during motor-operation at a lower one of its frequencies, as compared to the value of X during motor-operation at a higher one of its frequencies.

14. An alternating-current commutator motor adapted to operate at either one of at least two materially different alternating-current frequencies, said motor having exciting windings, commutating-pole windings and compensating windings, a shunting means connected at least to a portion of said commutating-pole windings, said shunting means having an effective impedance composed of a materially large resistance component R and a reactance component $jX$, where R is real and positive, and X is either real and positive, representing an inductance, or zero, or real and negative, representing a capacitance, impedance-changing means for, at times, causing an increase in X, regarding X as being increased when changing from more negative to less negative, or from less positive to more positive, or from negative to positive, and frequency-responsive means, responsive to one of the operating frequencies of the motor, for effecting an appropriate change in the condition of said impedance-changing means in such manner as to cause X to have an increased value during motor-operation at a lower one of its frequencies, as compared to the value of X during motor-operation at a higher one of its frequencies.

ROBERT STIX.